United States Patent Office 3,178,436
Patented Apr. 13, 1965

3,178,436
TROPINE ESTERS OF α-METHYLTROPIC ACID
Alberto Vecchi, Gaetano Melone, and Giulio Maffii, Milan, Italy, and Emilio Testa, Vacallo, Ticino, Switzerland, assignors to Lepetit S.p.A.
No Drawing. Filed Mar. 4, 1960, Ser. No. 12,666
Claims priority, application Great Britain, Mar. 16, 1959, 9,023/59; Sept. 23, 1959, 32,417/59
3 Claims. (Cl. 260—292)

This invention relates to new tropine esters. More particularly, the compounds with which the invention is concerned correspond to the following general formula

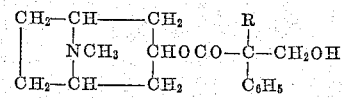

wherein R is a lower aliphatic alkyl radical.

The new tropine esters are prepared by starting from a tropic acid derivative of the formula

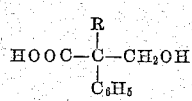

wherein R has the same significance as indicated above. It is thereby to be noted that the starting tropic acids can exist in both racemic and optically active forms due to the presence of an asymmetric carbon atom in the molecule. It is therefore possible by our process, to prepare tropine esters both racemic and optically active, according to the selected starting tropic acid derivative.

Not only have the new tropine esters proven superior to atropine in their activity, but they show the advantageous property that, prepared starting from optically active tropic acid derivatives, they do not undergo racemisation, as is the case with atropine. It is well known that atropine is used in its racemic form because the synthetically obtained optically active atropines readily undergo racemisation. Now, as it generally happens for most alkaloids and their synthetic analogues, our new tropine esters are markedly more effective in the optically active than in the racemic form.

The most appropriate process of preparing the new tropine esters consists in heating a mixture of equimolecular amounts of tropine and an α-phenyl-α-alkyl-β-acetoxy-propionic acid chloride of the general formula

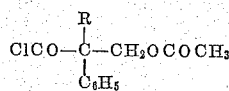

wherein R is as above defined, at 100–150° C. for 1–5 hours with or without the addition of an inert solvent, diluting the reaction mixture with water, adding an alkali metal hydroxide or carbonate to alkaline reaction, extracting with ethyl ether, making the ether solution acidic by the addition of HCl, collecting and dissolving the precipitate in water, adjusting the solution to a pH about 2 and allowing the solution to stand for 10–20 hours at room temperature to split off the acetyl group. The solution is then made alkaline by the addition of an alkali metal hydroxide or carbonate, extracted with ethyl ether and the solvent evaporated to dryness. The starting α-phenyl-α-alkyl-β-acetoxy-propionic acid chloride is in turn prepared from an α-phenyl-α-alkyl-β-hydroxypropionic acid, by converting this into the acetoxy derivative by refluxing it with acetic anhydride, pouring the mixture into water, extracting with ethyl ether and evaporating the solvent to dryness. The obtained α-phenyl-α-alkyl-β-acetoxypropionic acid is then converted into the acyl chloride by refluxing it with thionyl chloride, distilling off the excess thionyl chloride and distilling the residue in vacuo.

The following examples are illustrative of the invention.

EXAMPLE 1

*Resolution of α-methyltropic acid into its optical antipodes*

(a) *(−)-α-Methyltropic acid.*—To 100 g. of DL-α-methyltropic acid and 185 g. of quinine free base dissolved in 450 ml. of warm absolute ethanol, 450 ml. of distilled water were added and the mixture was heated for 5 minutes on a boiling water bath. After 24 hours at room temperature the crystalline precipitate was collected by suction, washed with 50% ethanol and dried: yield 118 g. of quinine (−)-α-methyltropate, M.P. 179.5°, $[\alpha]_D^{20}$ −120.7° (c.=2, ethanol). The recrystallisation from 50% ethanol, then from a 9:1 mixture of ethyl acetate and 95% ethanol gave M.P. 185–186°; $[\alpha]_D^{20}$ −121° (c.=2, ethanol). The above quinine (−)-α-methyltropate (60 g.) was suspended in 400 ml. of water and acidified to pH 1 with hydrochloric acid under cooling. The solution was extracted three times with ethyl ether; then the collected ether extracts were washed with water, dried over sodium sulphate and evaporated to dryness. The oily residue crystallised on standing; on recrystallisation from 1800 ml. of benzene-petroleum ether (1:1) (−)-α-methyltropic acid was obtained. M.P. 89–90°; $[\alpha]_D^{20}$ −28.3° (c.=2, ethanol).

(b) *(+)-α-Methyltropic acid.*—To a warm solution of 13.51 g. of DL-α-methyltropic acid in 54 ml. of absolute ethanol 20.6 g. of brucine free base in 54 ml. of warm water were added. The mixture was refluxed until a complete solution was obtained, then allowed to stand overnight. The precipitate separated was collected by suction, dried in vacuo and recrystallised from a 1:1 mixture of ethyl acetate and 95% ethanol. After standing some hours brucine (+)-α-methyltropate was collected; M.P. 209–212°; $[\alpha]_D^{20}$ −19.22° (c.=2, ethanol).

The brucine (+)-α-methyltropate may also be prepared from the mother liquors of the first crystallisation of quinine (−)-α-methyltropate after having separated the free acid by acidification.

The brucine (+)-α-methyltropate was treated as above described for quinine (−)-α-methyltropate. The crude product obtained was recrystallised from benzene-petroleum ether (1:1) yielding colorless needles melting at 88–90°; $[\alpha]_D^{20}$ +27° (c.=2, ethanol).

EXAMPLE 2

*DL-, D- and L-β-acetoxy-α-methyl-α-phenylpropionyl chloride*

A mixture of 13.5 g. of DL-α-methyltropic acid and 27 ml. of acetyl chloride was refluxed for half an hour, then the excess of acetyl chloride was removed in vacuo. The oily residue was treated with 70 ml. of thionyl chloride and refluxed one hour. The excess thionyl chloride was distilled off and the residue distilled from a Claisen flask to give 11.2 g. of DL-β-acetoxy-α-methyl-α-phenylpropionyl chloride, B.P. 113–116°/1 mm. The distilled product solidified on standing and was recrystallised from 70 ml. of petroleum ether. Yield 10.6 g. (59% of theoretical), M.P. 66–69°.

The (+)- and (−)-isomers were prepared, starting from the (+)- and (−)-α-methyltropic acid respectively, as described for the DL-isomer. The (+)- and (−)-forms were not distilled from the Claisen flask and isolated in a pure state but employed as such for the following condensation with tropine.

EXAMPLE 3

*α-Methylatropine (tropine DL-α-methyltropate)*

DL-β-acetoxy-α-methyl - α - phenylpropionyl chloride (5.8 g.) and tropine free base (4.2 g.), thoroughly mixed, were heated for 5 hours at 150°. After cooling to room temperature, the mixture was treated with 60 ml. of warm water, then with charcoal and filtered. The filtrate was adjusted to pH 9 with a saturated solution of sodium carbonate, extracted with ethyl ether and the ether extact dried over sodium sulphate and filtered. The filtrate was made acidic to Congo red by treatment with a saturated ether solution of hydrogen chloride. A thick oil separated, which was decanted from the ether and dissolved in water. Two drops of 10% hydrochloric acid were added to this solution and the mixture was allowed to stand for 15 hours at room temperature. A saturated solution of sodium carbonate was then added, the separated oil extracted with ethyl ether. dried over sodium sulphate and concentrated to a final volume of 20 ml. On cooling and rubbing α-methylatropine precipitated in the form of white fine crystals. Yield 6.9 g., M.P. 131–133°.

*Analysis.*—Calcd. for $C_{18}H_{25}NO_3$: C, 71.25; H, 8.30; N, 4.61. Found: C, 71.04; H, 8.29; N. 4.79.

(—)-α-*Methylhyoscyamine* [*tropine* (—)-α-*methyltropate*]

A mixture of 3.74 g. of tropine free base, 6.24 g. of (—)-β-acetoxy-α-methyl-α-phenylpropionyl chloride and 4 ml. of anhydrous toluene was heated for 4 hours at 120–125°, then cooled, treated with 65 ml. of water and acidified to pH 1 with 10% hydrochloric acid. The mixture was extracted with ethyl ether, the aqueous layer treated with a saturated solution of sodium carbonate and extracted with ethyl ether. This ether extract was dried over sodium sulphate and acidified to pH 1 with a saturated ether solution of hydrogen chloride. The ether was decanted off and the oily residue treated with water, acidified with 10% hydrochloric acid and allowed to stand 15 hours. The mixture was made alkaline with a saturated solution of sodium carbonate, extracted with ethyl ether, the ether extract washed with water, dried over sodium sulphate and made acidic with a saturated ether solution of hydrogen chloride. The ether was decanted off, the residual oil treated with boiling ethyl acetate with the addition of charcoal and filtered. After standing some days crystalline (—)-α-methyl-hyoscyamine hydrochloride was collected; M.P. 210–212°; $[\alpha]_D^{20}$ —6.8° (c.=1, water).

*Analysis.*—Calcd. for $C_{18}H_{25}NO_3 \cdot HCl$: C, 63.61; H, 7.42; N, 412; Cl, 10.4. Found: C, 64.01; H, 7.50; N, 4.09; Cl, 10.2.

(+)-α-*Methylhyoscyamine* [*tropine* (+)-α-*methyltropate*]

It was prepared exactly as described for (—)-α-methylhyoscyamine starting from 3.99 g. of tropine free base, 6.63 g. of (+)-β-acetoxy-α-methyl-α-phenylpropionyl chloride and 4 ml. of anhydrous toluene. Crystalline (+)-α-methylhyoscyamine hydrochloride has M.P. 210–211.5°; $[\alpha]_D^{20}$ +7.3° (c.=1, water).

*Analysis.*—Calcd. for $C_{18}H_{25}NO_3 \cdot HCl$: C, 63.61; H, 7.42; N, 412; Cl, 10.4. Found: C, 63.49; H, 7.95; N, 3.70; Cl, 10.85.

What we claim is:

1. A levorotatory α-methyltropic acid ester of the formula

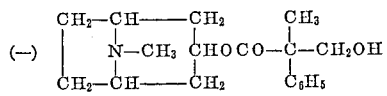

2. A process for preparing a tropic acid ester of the formula

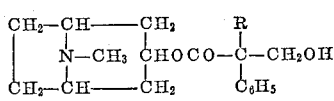

wherein R is a lower alkyl radical, which consists in heating a mixture of equimolecular amounts of tropine and an α-phenyl-α-alkyl-β-acetoxypropionic acid chloride of the formula

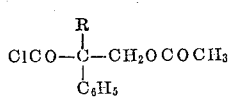

wherein R has the above significance, at 100–150° C. in an inert organic solvent and splitting off the acetyl group with hydrochloric acid at room temperature.

3. The process which comprises heating and reacting the acid chloride of the β-acetoxy derivative of a separated optical antipode of alpha-loweralkyl-tropic acid with tropine free base until the acetoxy derivative of the optical antipode of the alpha-lower alkyl-tropic acid ester of tropine is obtained, and acid-hydrolyzing the reaction product to split off the acetoxy group and thus replace it with hydroxyl.

References Cited in the file of this patent
UNITED STATES PATENTS 2,800,477  Stoll et al. _____ July 23, 1957
2,833,773  Nador et al. _____ May 6, 1958

OTHER REFERENCES

Foster et al.: J. Chem. Soc., 1956, pp. 938–40.
Karrar: Organic Chemistry (4th Eng. ed.), pp. 102–105 (1950).
Foster et al.: Chem. Abstracts, vol. 50, col. 15551 (1956).